Dec. 24, 1935.  A. H. NEULAND  2,025,523
AUTOMATIC TRANSMISSION SYSTEM AND AUXILIARY CONTROLS THEREFOR
Filed Dec. 30, 1932  2 Sheets-Sheet 1

INVENTOR
ALFONS H. NEULAND
BY Ralph B. Stewart
ATTORNEY

Dec. 24, 1935.   A. H. NEULAND   2,025,523
AUTOMATIC TRANSMISSION SYSTEM AND AUXILIARY CONTROLS THEREFOR
Filed Dec. 30, 1932   2 Sheets-Sheet 2

*Fig. 2.*

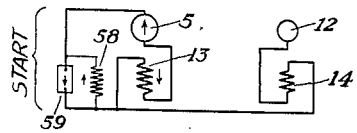

*Fig. 3.* ACCELERATOR RELEASED

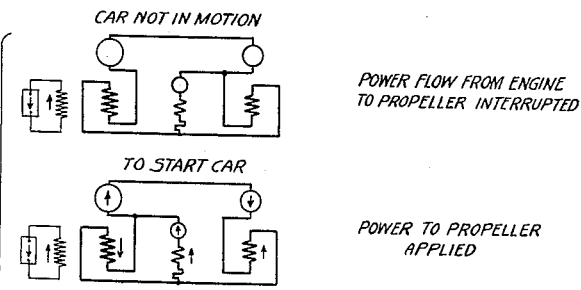

POWER FLOW FROM ENGINE TO PROPELLER INTERRUPTED

*Fig. 4.* ACCELERATOR SLIGHTLY DEPRESSED

POWER TO PROPELLER APPLIED

*Fig. 5.* ACCELERATOR SUBSTANTIALLY DEPRESSED

POWER FLOW FOR ORDINARY DRIVING CONDITIONS WITH MODERATE ENGINE SPEED

*Fig. 6.* ACCELERATOR FULLY DEPRESSED

HIGH ENGINE SPEED FOR EXTRAORDINARY DRIVING CONDITIONS

*Fig. 7.* ACCELERATOR RELEASED TO IDLING THROTTLE POSITION

PROPELLER DRIVES ENGINE AT MODERATE SPEED FOR MILD BRAKING WITH ENGINE FRICTION

*Fig. 8.* BRAKE SLIGHTLY DEPRESSED

PROPELLER DRIVES ENGINE AT HIGH SPEED FOR INCREASED BRAKING WITH ENGINE FRICTION

*Fig. 9.*

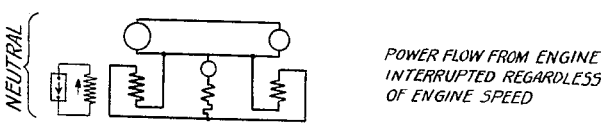

POWER FLOW FROM ENGINE INTERRUPTED REGARDLESS OF ENGINE SPEED

*Fig. 10.*

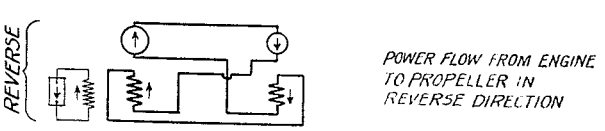

POWER FLOW FROM ENGINE TO PROPELLER IN REVERSE DIRECTION

INVENTOR
ALFONS H. NEULAND
BY *Ralph B. Stewart*
ATTORNEY

Patented Dec. 24, 1935

2,025,523

UNITED STATES PATENT OFFICE 2,025,523

AUTOMATIC TRANSMISSION SYSTEM AND AUXILIARY CONTROLS THEREFOR

Alfons H. Neuland, Irvington, N. J.

Application December 30, 1932, Serial No. 649,636

43 Claims. (Cl. 290—17)

My present invention relates to improved methods and means for transmitting power from a power source to a load and for variously controlling the power source and the load.

More specifically, my invention relates to an automatic transmission system particularly suited to motor vehicles using an internal combustion engine as the source of power.

The present invention is related to the invention disclosed in my copending application for Electric systems and control for motor vehicles and other purposes, Serial No. 508,094, filed January 12, 1931 in which I have disclosed a complete transmission system for controlling the application and interruption of power when the car is standing still, and for controlling the engine speed and ratio of power transformation by the mere depression of and variation in the movement of the accelerator or throttle mechanism.

My present invention is particularly directed to and has as one of its objects the establishment of certain relations and adjustments between the throttle, a foot accelerator pedal and a hand operated control for the throttle usually arranged on the dash-board or on the steering wheel of the vehicle.

Another object is to provide a certain relationship between the accelerator pedal, the engine throttle and an electric switch whereby power can be applied and interrupted by a slight movement of the accelerator pedal without necessarily changing the throttle opening.

Still another object is to provide an improved regulating dynamo which is energized from one of the main dynamos during one stage of operation and is self-excited during another stage of operation.

Still another object is to vary the full throttle engine speed independently of the speed of the vehicle with means such as a switch connected to the throttle mechanism for varying the resistance and voltage of the regulator with respect to that of the booster dynamo field winding after the throttle has been substantially fully opened.

Still another object is to brake or decelerate the vehicle with engine friction in combination with means for varying the degree of engine friction braking.

Still another object is to provide a simple and effective means for teasing the booster dynamo, that is, the dynamo which is connected in fixed speed relation with the engine so as to reverse the residual mechanism in the booster field whenever load current ceases during operation of the booster as a motor.

Still another object is to provide simplified circuit connections for operating the booster as a motor to start the engine.

A further object of my invention is to provide for a plurality of inter-locking switches so as to permit the progressive movement of a single control lever to establish the desired circuit connection.

Other objects and advantages of my improved system will appear from the following detailed description and from the appended drawings showing a preferred embodiment of my invention which I have selected for illustration and in which Fig. 1 is a schematic representation of the elements of my system and including a plurality of switches and their connections with the vehicle and engine controls.

Fig. 2 is a simplified diagram showing the connections which are established to start the engine.

Figs. 3, 4, 5, 6 and 7 are simplified diagrams showing the connections and current relationship between the armatures and fields that may be established during forward operation with the accelerator in various positions.

Fig. 8 shows circuit connections for increased braking with engine friction.

Fig. 9 shows connections with the control lever in neutral.

Figure 10 shows circuit connections established by the controller for reverse operation.

Figure 1:
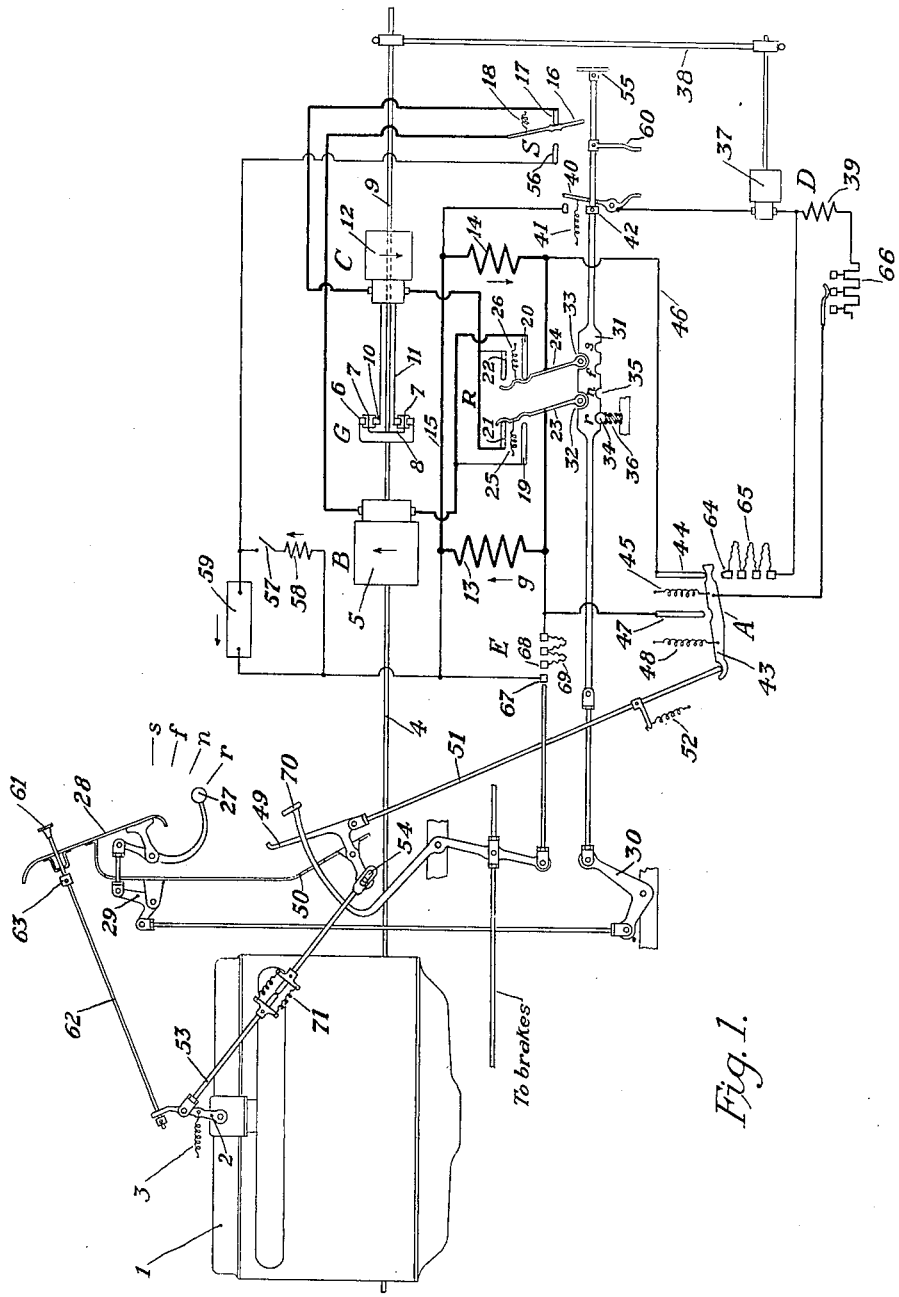

Referring to the figures, the transmission system consists of an internal combustion engine 1 having a throttle 2 normally held in nearly closed or idling position by means of the spring 3. The engine shaft 4 is connected in fixed speed relation with the armature 5 of a dynamo B, which will hereafter also be referred to as the booster dynamo and is also connected with a ring sun gear 6 of a differential or epicyclic gear train G meshing with the planet gears 7, 7 carried by a spider 8 which in turn is secured to a propeller or load shaft 9. A dynamo armature 12, which will hereafter also be referred to as the clutch dynamo, is connected in variable speed relation with respect to engine and propeller shafts by means of a sleeve 11 and a small internal sun gear 10 connected thereto and meshing with the planet gears 7. The booster dynamo is provided with a series field coil 13 and the clutch dynamo with a series field coil 14. The upper ends of the field coils 13 and 14 are connected together by a conductor 15 and the upper brush leads of the armatures 5 and 12 are connected together by the finger 16 of the switch S normally held closed with the contact block 17 by means of the spring 18. The lower brush leads of the booster and clutch armatures are connected to the contact blocks 19, 20 and 21, 22 respectively of a reversing switch R having its switch finger 23 connected to the free end of the booster field coil 13 and the switch finger 24 with the free end of the clutch field coil 14. The switch fingers 23 and 24 are provided with springs 25, 26 respectively, which serve to establish a firm contact between the switch fingers and either or both of the upper and lower contact blocks depending upon the position of the control lever 27 carried by the dash-board 28 and connected through the bell cranks 29, 30 and suitable rods therebetween with the plate 31 provided on one side with grooves 32, 33 into which the switch fingers 23, 24 respectively, are fitted and provided on the other side with a plurality of notches corresponding to the reverse, neutral, forward and start positions of the lever 27. With the controller in forward position both series field coils 13 and 14 are normally connected in motoring direction for operation in direction of engine rotation.

It should be noted that the tension of the springs 25, 26 can be made very substantial and a firm contact secured without requiring excessive effort on the part of the driver to operate the switch, in view of the substantial fulcrum which may be provided and in view of the absence of sliding friction. The switch fingers are preferably notched to prevent them from sliding off as they rock over the ends of the contact blocks, the full tension of the spring being exerted thereon for this purpose. Furthermore, the switch is held in any of the positions shown by a ratchet mechanism such as the ball 34 which is pressed into the notches 35 by the spring 36, making it possible to unfailingly establish the various switch positions regardless of any lost motion or inaccuracy that may exist in the adjustment of the bell cranks and the rod connections between the switch and control lever 27, and also enabling the operator to feel the change between the several positions as the ratchet moves out of one and into the next position. Where this is insufficient, any suitable indicating device may be arranged on the dash or other convenient place to be operated from the lever 27 so as to provide the driver with visual indication of the several positions to which the switch may be moved, as shown by the letters s, f, n and r. Another arrangement would be to support a suitable indicator plate from the dash adjacent the lever 27 with suitable markings thereon to indicate the various positions of the lever.

An armature 37 of a regulating dynamo D is connected to the load shaft 9 by means of a belt 38. The field of the regulating dynamo is energized by the clutch dynamo while the load shaft is at rest or rotates at low speed, or is self-excited from the regulator armature 37 as the load shaft speeds up. In my preferred embodiment I provide a field coil 39 for the regulator which is connected in series with the regulator armature 37. Inasmuch as the regulator is connected across one of the series field coils 13 or 14 having low resistance, the series coil on the regulator insures the building up of current in the regulator and in load circuit of the system. One terminal of the regulator is connected to the conductor 15 by means of the switch 40 which is normally held closed by the spring 41 and is opened by the collar 42 when the reversing switch R is moved into the reverse position (n). The other terminal of the regulator is connected to a finger 43 of a switch A which serves, when in one position, to engage with the contact block 44 by means of a spring 45 and establishes a circuit through the wire 46 with the field coil 14 and switch finger 24. Switch A may be similar to the switch R heretofore described, and is provided with a second contact block 47 connected to the other end of field coil 13 and to the switch finger 23 so that finger 43, as it moves from one position to another, connects the regulator terminal progressively with one or both of the contacts 44, 47. However, the switch finger 43 is being normally held open with respect to contact block 44 and closed with contact block 47 by means of the spring 48 having sufficient tension to over-power the spring 45.

The switch A is arranged to be operated by the accelerator pedal 49 on the toe-board 50 by means of the rod 51 and the spring 52. The lower end of rod 51 bears against the left end of finger 43 and the tension of the spring 52 is superior to that of the spring 48 and operates to normally establish contact between 43 and 44 and to hold the accelerator in a released position corresponding to a substantially closed or idling throttle position. If desired, a pivoted connection may be made between the lower end of rod 51 and finger 43 and the spring 48 may then be omitted, the function of the spring being performed by the operator in pressing down the pedal 49. A rod 53 connects the engine throttle with the accelerator pedal 49. I provide a certain amount of lost motion between the pedal 49 and the throttle 2 as for example, by the slot 54 in the rod 53 connecting the engine throttle with the accelerator to permit the operation of the switch A by a slight depression of accelerator 49 without substantially or without at all opening the engine throttle.

*Engine starting*

Turning now to the operation of my system, the switch 57 which is preferably located on the dash, may be closed to establish a connection between the battery 59 and the teaser coil 58 of booster B, the purpose of which will hereafter be more fully described. The engine is started by moving the control lever 27 into starting position, represented by the letter (s). This moves the slide 31 to the extreme left and establishes contacts between 19 and 23 and between 22 and 24, and at the same time the finger 60 opens the switch 40 and the collar 55 moves the finger 16 of the switch S to open the circuit with contact 17 and close it with contact 56, thereby establishing a circuit from the battery 59 through the booster field coil 13, switch finger 23, contact 19, armature 5, switch contacts 16 and 56 back to the other terminal of the battery, and since in this position of the switch R the booster is connected for motoring operation, it rotates the engine shaft in the direction of engine operation and so starts the engine. The connections and current relationships so established are shown in the simplified diagram Fig. 2 in connection with which it should be noted that although the current in the teaser coil 58 opposes the motoring magnetization, it is not strong enough to substantially affect the torque of the motor. If it is desired to speed up the engine for the purpose of warming it up, the lever 27 is allowed to remain in the starting position and the engine may be accelerated by the accelerator pedal in the usual way.

In order to permit the operator to run his engine independently of the accelerator 49 and prevent the car from starting in case lever 27 is in position (f), I provide controlling means which may conveniently be mounted on the steering wheel or on the dash board of the vehicle and which may take the form of a plunger 61 connected with the throttle 2 by means of the rod 62 so as to permit a partial opening of the throttle and adjustment of the idling speed of the engine by moving the plunger to various positions, the movement in the direction of open throttle being limited by the stop 63 preferably adjusted with respect to the slot 54 in the rod 53 so that movement of the plunger 61 within predetermined limits will not impart movement to the accelerator pedal 70. This arrangement of the controls permits the driver to vary the engine throttle opening and to adjust the idling of the engine to the speed desired by means of the plunger 61 without moving the accelerator pedal 49 and therefore without inadvertently starting the car. The operator may use control 61 for warming up the engine with lever 27 in position (f). If the engine is to be operated at higher speeds than permitted by the control 61, the control lever 27 may be moved to the neutral position (n) which shifts the slide 31 to a position where the switch fingers 23 and 24 may contact with 19, 21 and 20, 22, respectively short-circuiting both fields and establishing circuit connections shown by Fig. 9 in which position power flow from engine is interrupted regardless of engine speed. In this position the accelerator pedal 49 may be moved to any position without the danger of inadvertently starting the car, the slight magnetization due to the teaser coil 58 notwithstanding.

*Forward position; idling operation*

For operation in forward direction, the control lever 27 is moved to the position (f) which rocks the switch fingers 23, 24 to the left so that they make contact with 19 and 22 respectively, establishing the circuits shown in Fig. 3, while the accelerator remains in the released position. The rotation of the engine drives the armature 12 in the reverse direction with respect to engine rotation and, since the clutch dynamo is connected as a motor during rotation in direction of engine rotation, reverse rotation of the armature 12 permits it to operate as a series generator. The slight magnetization of teaser winding 58 produces a voltage in the armature of booster B in the direction of the arrow in Fig. 3, which is in a direction to aid the clutch in establishing a current in the load circuit in the direction of the arrow. However, the field coil 13 of booster B is connected in motoring direction, and a small current flowing in the load circuit is sufficient to reverse the magnetization in the booster and establish a counterelectro-motive force in the booster armature opposing the voltage of the clutch C. In the preferred embodiment the booster is physically and electrically larger than the clutch dynamo, and the current required in the load circuit to establish a counterpotential in the booster sufficient to balance the voltage of the clutch is of a relatively small value compared with full load current and is too small to start or move the car while the accelerator is in idling position. Even though the booster were to be of the same size or even smaller than the clutch, current in the circuit would be prevented from building up to any appreciable extent, due to the connection of the regulator across the clutch field 14 which so weakens the clutch field as to prevent the clutch from building up a substantial predominating voltage and current flow in the circuit.

*Forward running*

In order to start the car, it is necessary to slightly depress the accelerator 49. This raises the rod 51 against the tension of the spring 52 and thereby effects operation of switch A to break the connection between switch finger 43 and contact 44 and to make connection between 43 and 47 and so establish the connections and current relationships shown in Fig. 4 without necessarily opening the throttle; this being made possible by the slot 54 being so adjusted that switch A may be operated independently of the throttle opening. The regulator dynamo is now connected in parallel circuit relation with the booster field 13, the relative resistance of the booster field coil 13 and the regulator armature and field coil being proportioned so that the clutch potential will predominate over the booster counter-potential to the point where a fully depressed throttle will build up a predetermined current in the load circuit and will establish the necessary predetermined torque relationship between the clutch, booster and engine required to produce at the load shaft the desired torque increase over that supplied by the engine. The current builds up even with a relatively low engine speed such as the idling speed and sets the car in motion, the degree of acceleration being controlled by variations in the depression of the accelerator. As the car accelerates, the regulator voltage builds up until it reaches a point where the generated potential equals the voltage drop in the regulator, when the current in the booster field coil 13 has decreased to zero and thereafter, as the generated potential increases and exceeds the internal voltage drop in the regulator, current in the booster field coil 13 reverses and builds up in the opposite direction. During this period the clutch slows down, comes to a stop, changes to a motor and speeds up in direction of engine rotation. The booster automatically changes to a generator before the clutch has come to a full stop at which instant both operate as mild generators each supplying a portion of the voltage necessary to maintain current in the load circuit and as the increasing voltage of the regulator increases the booster excitation, the clutch is forced to become a motor and speed up in direction of engine rotation receiving energy from the booster and thereby driving the load at a speed determined by the combined speeds of the engine and the clutch dynamo.

After the car has accelerated and the driver merely wishes to maintain the speed, he releases the accelerator slightly thereby reducing the throttle opening and the torque developed by the engine, which is immediately reflected in a reduced current through the booster and clutch armatures in the load circuit, and, inasmuch as the regulator speed and its field excitation have not substantially changed, the current thru the regulator remains substantially unchanged and the reduced current thru the load circuit is accompanied by an increased current thru the booster field coil 13, its field flux is increased and the increased torque demand upon the engine from the booster forces the engine to slow down. The increased field strength in the booster field coil 13 and the reduced field strength in the series coil 14 of the clutch serving to maintain or even increase the speed of the armature 12 and so maintain a relatively high car speed with reduced engine speeds.

From the foregoing it will be seen that the working magnetization of the booster dynamo is controlled jointly in response to changes in the load current and in accordance with speed variations of the load shaft.

It will also be noted that the system is inherently stable and that it requires no special stabilizing means sometimes used in connection with series wound dynamos. For instance, during the period when the car is in motion and the booster operates as a motor, any sudden decrease of current in load circuit due to a sudden release of the throttle and a consequent reduction in torque delivered by the engine, is instantaneously accompanied by an even greater decrease in the current thru the series field coil 13. This is due to the presence of the regulator connected in parallel circuit relation with the booster field coil which effects such reduction in current thru field coil 13 at a greater rate with respect to reduction of current in load circuit, due to the presence of the generator potential in the regulator, as heretofore explained, and which not only operates to decrease current in coil 13 at a greater rate, but will cause a reversal of current therein whenever load current approaches zero and turn the booster into a generator and so maintain load current in the same direction.

During the period when the car is standing still, a cessation of current in load circuit after the booster has operated as a motor, leaves a residual magnetism in the booster field element which has motoring direction which, due to the magnetomotive force of the teaser coil, is immediately reversed whenever current in load circuit approaches zero, whereby a small load current is maintained in a given direction when the engine idles, and which is immediately increased and built-up when the accelerator is slightly depressed and the switch A operated.

During the period when the car is in motion and the booster operates as a generator, the automatic increase of current thru the series coil 13 in respose to a decrease of current in load circuit and vice versa, similarly provides inherent stability without the use of special stabilizing devices. The presence of the teasing coil has no appreciable effect during the period when the transmission is transmitting power as its magnetomotive force is relatively too slight with respect to the magnetization produced by the coil 13 to have any effect.

It will be seen that during the period of acceleration and change of the booster from operation as a motor to operation as a generator in response to an increase in the speed of the load shaft and in response to a reduction in the engine throttle opening, the circuit connections have not been changed as shown by Figs. 4 and 5, all of these changes having been brought about automatically, that is, in response to variations in the speed of the load shaft and variations in the throttle opening or torque produced by the engine, all of which is fully described in my co-pending application, Serial No. 508,094 filed January 12th 1931. In the said prior application, the regulator field is excited from a separate source and will therefore, build up a voltage in a direction determined by such separate excitation. This requires that the direction of current in a load circuit build up in a direction to correspond with the regulator potential to permit proper co-operation between one and the other. This makes it necessary that some effective form of teasing be provided in order to insure building up of current in the load circuit in the same direction.

In accordance with my present invention, the regulator field is energized from the clutch armature, before the car is set into motion or while its speed is low, and it becomes self-exciting or is energized from the regulator armature 37 as the car speeds up. This arrangement permits the entire system to be self-exciting and permits it to operate irrespective of which direction current in the load circuit builds up, although in the described embodiment of my invention I prefer to employ a small teaser winding 58 supplied with a relatively small amount of current from the battery in order to insure that current in the load circuit will build up initially in a given direction. If desired, a separate field winding may be added to the regulator in addition to the series field winding, and this separate winding may be connected in series circuit relation with teaser winding 58 across battery 59 and controlled by switch 57.

In accordance with my present invention, I provide additional switching means operated by the accelerator after the throttle has been substantially fully opened in order that the full throttle engine speed may be increased at any speed of the vehicle so as to release an extra component of engine power to take care of extraordinary driving conditions, as for climbing steep grades or for extra fast acceleration. In the illustrated embodiment, these means are represented by the contact blocks 64 to which a resistance 65 may be connected, arranged to make contact with the switch finger 43 as the accelerator is substantially fully depressed and establish circuit connections shown in Fig. 6 to shunt current away from the regulator field coil 39, thereby reducing the regulator terminal potential and current through the booster field coil 13 when the booster operates as a generator. The reduced torque reaction on the engine permits it to speed up and deliver increased power which, due to the changed relationship in the field coils 13 and 14, causes load current in the circuit and load torque at the shaft 9 to be increased. The contact 64 may be arranged to close with switch finger 43 before the engine throttle reaches full throttle position, however, I prefer to adjust the switch finger 43 to establish contact with 64 after the throttle has been fully opened, for which purpose a spring 71 may be interposed between the two parts of the rod 53 permitting the pedal 49 to continue its movement and to operate said switch after the throttle has been fully opened. Where the variation that may be secured from shunting the coil 39 is insufficient, I proportion the resistances and the voltage drops in the booster coil and the regulator, as well as the potential of the regulator, so as to permit the use of a resistance 66 in series with the regulator coil 39 by means of which the range of variation in engine speed with full throttle can be increased and which is also useful in adjusting the relationship between currents in the booster and clutch field coils and therefore also the torque relationship between engine and propeller and the maximum torque multiplication with full engine throttle when the car is not in motion. It should be noted that instead of employing the switch finger 43 to make contact with 64, a separate switch may be used to be operated as heretofore described and that a single contact 64 may be employed without the use of resistance 65 to merely short-circuit the field coil 39 or a portion of it.

*Braking*

Whenever the car is in motion and the accelerator is released to the point where the throttle is substantially closed, the finger 43 of the switch A still makes contact with 47 alone and maintains the connections shown in Fig. 4, the vehicle free wheels, that is, its momentum keeps it in motion without being impeded by engine drag, the engine slowing down to its idling speed. It is desirable to hold back or decelerate the vehicle with engine friction especially when descending steep grades, which with my system is accomplished by entirely releasing the accelerator pedal 49. The spring 52 moves the finger 43 of switch A out of engagement with 47 and in contact with 44 thereby establishing circuit connections shown in Fig. 7. The regulator has been disconnected from the booster field and has been connected across the clutch field coil 14, thereby energizing the coil causing the clutch to operate as a generator. Current from the clutch flows thru the booster, which is normally connected as a motor and therefore drives the engine, the circuit being completed thru the regulator as shown by the arrows in Fig. 7. The regulator now carries the load current as well as the magnetizing current supplied to the field coil 14. It should be noted that as the switch A changes from the contact 47 to contact 44 it instantaneously makes contact with both and so establishes a circuit with field coil 14 before breaking the circuit with field coil 13, which helps to minimize sparking at the switch points as a deflection of current from the regulator to the coil 14 is accompanied by a reduction of current thru coil 13, and therefore by a reduction of current at the contact points before they become separated. The regulator during this stage operates to limit current thru the load circuit as an increased current in the load circuit automatically shunts current away from the field coil 14, thereby minimizing the clutch magnetization and limiting the current and therefore preventing shock to the system. The regulator also operates to maintain engine friction braking at relatively low car speeds, since a substantial reduction in the load current is accompanied by a substantial increase in the field current thru coil 14 whereby braking is maintained, even at low vehicle speed. This feature has also been described in my copending application, Serial No. 508,094, filed January 12, 1932.

My present invention contemplates a still further improvement in the effectiveness of engine friction braking, and consists of means for reducing the booster counter-potential in order to maintain current flow in the load circuit with very low speed of the clutch armature 12. Assuming that the clutch armature 12 just barely rotates and generates a potential sufficient to overcome the resistance of the circuit and to force a current thru the load circuit and so provide the necessary fulcrum, the propeller shaft 9 by means of the fulcrum established between armature 12 and sun gear 10, spins the engine thru the gearing at a much higher speed than that of the propeller, the increased engine friction resulting therefrom supplying an additional braking component which is effective in reducing the car speed to a low value on steep grades. In the illustrated embodiment this is accomplished by a switching means E consisting of contactors 67 and 68 and a resistance 69 arranged so as to shunt or short-circuit the booster field coil 13 by means of a separate control or in response to movement of the pedal 70, which may also be employed to operate the vehicle brakes and is adjusted so that a slight depression will close the contacts 67, 68 and effect increased braking by means of engine friction before a further depression of brake pedal 17 engages the vehicle brakes. The circuits so established are shown in Fig. 8. Where the current limiting feature of the regulator is sufficient to avoid shock, or where greater simplicity is desired, the resistance 69 may be omitted and the booster field may be short-circuited by a simple switch.

*Reverse*

To operate the vehicle in reverse direction, the control lever 27 is moved to the position (r), establishing the connections shown in Figs. 1 and 10. It is seen that in this position, both fields are reversed with respect to both armatures and the regulator circuit is opened by the collar 42 pressing against the switch finger 40. The booster now operates as a powerful generator, the current from it driving the clutch as a motor in reverse direction with respect to engine rotation. The rotation of the armature 12 rotates the spider 8 and therefore the propeller shaft 9 and establishes a fulcrum thru gear 6 with respect to engine shaft in direction of engine rotation, so that with a given size of clutch capable of developing the desired reverse torque, the power of the booster must be proportioned to absorb the full engine torque in addition to the torque reaction produced by the armature 12 thru the gearing. This feature has also been described in my copending application Serial No. 508,094, filed January 12, 1931.

The structural arrangement of booster B, gearing G and clutch C is formed as a unitary structure generally as also disclosed in my copending application Serial No. 508,094. The various switch structures A, E, R, S etc., are enclosed in suitable housing which may be mounted upon the common frame of the main dynamos. The regulator dynamo D is also mounted upon the main dynamo frame generally as shown in my copending application. If desired, a common operating member may be employed for closing and opening the teaser field circuit and the engine ignition circuit.

It should be noted that my system is well adapted for use in so-called gas-electric drives in which a generator is driven by an internal combustion engine and supplies one or more motors with electric energy for driving the vehicle. Even though no differential gearing or other gearing connection is used between the motor and generator or between the engine and the propeller shaft my system is applicable to such drives and operates substantially as heretofore described except that during acceleration of the load one of the dynamos, the booster, operates as a generator and the other dynamo, the clutch operates as a motor, and except that the regulating generator is driven from the engine instead of from the propeller shaft, the relationship between the generator field and voltage drop and the regulator resistance and voltage being chosen so as to secure the desired change in the generator field in response to variations in load current. When used in connection with such gas-electric drives, it may also be desirable to partially energize the generator field from a separate source, although in most instances, the connection of the regulator with the engine and its electric connection across the relatively low resistance of the generator field is well suited to cause the system to build-up even with a moderate increase in engine speed above its idling speed without separate excitation.

The feature of automatically varying the excitation of a dynamo in response to changes in load current, especially at a greater rate, is also well suited for purposes other than transmission systems, for instance, it may be employed in arc welding generators to vary the voltage of the generator so as to automatically lower it when the load current increases and to increase the voltage in response to a reduction in the load current and thereby maintain the arc stable. The generator and regulator, in this instance, may preferably be driven by a common prime mover such as an electric motor or an engine.

It will be understood that many of the features disclosed in connection with the invention are ancilliary to the main system and, in some cases, are not essential to the fundamental mode of operation of the system. For example, the finger 60 may be omitted if care be taken to see that the accelerator is not depressed with lever 27 in starting position; elements 67, 68 and 69 may be omitted if the added braking effect is not desired; and the elements 64 and 65 may be omitted where driving requirements are not severe.

Having now described one embodiment of my invention I desire to have it understood that my invention is adapted for use in other embodiments and that only limitations required by the prior art or appended claims be imposed upon it.

I claim:

1. In combination, an engine, a load, a power transmission circuit connecting the engine and the load including a series wound dynamo, and a series wound regulator generator connected in shunt to the series field coil of said dynamo.

2. In combination, an engine, a load shaft, a power transmission circuit connecting the engine and the load shaft including a series wound dynamo, a series wound regulator generator driven by said load shaft, said series wound regulator generator being connected in shunt to the series field coil of said dynamo.

3. In combination, a generator having an armature and a field coil, a load circuit including the generator field coil and armature connected in series circuit relation, and an auxiliary generator having an armature and a field coil connected in series circuit relation with each other and in parallel circuit relation with the field coil of the main generator.

4. An apparatus for transmitting power between an engine and a load, said apparatus including an engine, a load shaft, a power transmitting load circuit including a pair of power transmitting dynamos each having an armature and a series field coil all connected in series circuit relation with one another to form a series circuit, and means for changing the current in the field coil of one dynamo with respect to the current in the field coil of the other dynamo in response to changes of current in said armatures including a regulating dynamo having an armature and field coil connected in series with each other and connected in parallel circuit relation with the series field coil of one of the power transmitting dynamos.

5. An apparatus for transmitting power between an engine and a load, said apparatus including an engine, a load shaft, a power transmitting load circuit including dynamo electric apparatus, a regulating dynamo having an armature and a field coil connected in series circuit relation with said armature, and means including said regulating dynamo for changing the torque ratio between said engine and said load in response to changes of current in the load circuit.

6. An apparatus for transmitting power between an engine and a load, said apparatus including an engine, a load shaft, a power transmitting load circuit including dynamo electric apparatus, a regulating dynamo having an armature and a field coil connected in series circuit relation with said armature, and means for changing the torque ratio between said engine and said load in response to changes of current in the load circuit including the regulator connected to be traversed by load current.

7. Apparatus for transmitting power between an engine and a load, said apparatus including an engine, a load shaft, a power transmitting load circuit including dynamo electric apparatus, a series wound regulating dynamo connected in said load circuit and connected in fixed speed relation with the load shaft, and means including said regulating dynamo for changing the torque ratio between said engine and load in response to changes in the speed of said load shaft.

8. Apparatus for transmitting power from an engine to a load including an engine, a load shaft, a power transmitting dynamo having a field winding, a series wound regulating dynamo connected in parallel with said field winding and having its resistance in predetermined proportion to the resistance of said field winding for establishing a predetermined maximum torque ratio between said engine and said load shaft when said load shaft is at rest, and means including said regulating dynamo for varying said torque ratio in response to the speed of said load shaft.

9. In combination, an engine, a load, a power transmission circuit connecting the engine and load including a series wound dynamo connected in fixed speed relation with the engine, a path connected in shunt to the series field coil of said dynamo including a variable resistance element, an accelerator for the engine, and means positively responsive to the operation of said accelerator upon reaching substantially fully open throttle position for varying the resistance of said element.

10. In combination, an engine, a load, a power transmission circuit connecting the engine and load including a series wound dynamo connected in fixed speed relation with the engine, a path connected in shunt to the series field coil of said dynamo, including a variable resistance element, an accelerator for the engine, and means positively responsive to the operation of said accelerator for decreasing the resistance of said element as the throttle opening is increased.

11. In combination, an engine, a load shaft, a series wound generator driven by said engine, a motor coupled to said load shaft and connected to said generator for driving said shaft, a path connected in shunt to the series field coil of the generator including a variable resistance element, an accelerator for the engine, and means positively responsive to the operation of the accelerator for decreasing the resistance of said element as the throttle opening is increased.

12. In combination, an engine, a load shaft, a series wound dynamo driven by the engine, a motor coupled to the load shaft and connected to the dynamo for driving the load shaft, an accelerator for the engine, means responsive to movement of the accelerator from idling position to connect a path in shunt with the series field coil of said dynamo, and means operated by said accelerator upon reaching substantially full throttle position to decrease the resistance of said shunt path.

13. In combination, an engine having a throttle and an accelerator control therefor, a load shaft, a series wound dynamo driven by the engine, a motor coupled to the load shaft and connected to the dynamo for driving the shaft, means responsive to movement of the accelerator from idling position to connect a path in shunt to the series field coil of the dynamo, and means responsive to the movement of said accelerator beyond substantially full throttle position for progressively decreasing the resistance of said shunt path.

14. In combination, an engine, a load, a power transmission circuit connecting the engine and the load including a series wound dynamo, a regulator generator connected in shunt to the series field coil of said dynamo, an accelerator for said engine, and means controlled by said accelerator for varying the excitation of said regulator generator.

15. In combination, an engine, a load shaft, a series wound generator driven by said engine, a motor coupled to said load shaft and connected to said generator for driving said shaft, a regulator generator driven by the load shaft and connected in shunt to the series field coil of said first generator, an accelerator for said engine, and means controlled by said accelerator for decreasing the excitation of said regulator generator as the throttle opening increases.

16. In combination, an engine, a load shaft, a series wound generator driven by said engine, a motor coupled to said load shaft and connected to said generator for driving said shaft, a series wound regulator generator connected in shunt with the series field coil of said engine generator, an accelerator for said engine, and means actuated by said accelerator for shunting the series field of the regulator generator.

17. In combination, an engine having a throttle and an accelerator therefor, a load shaft, a series wound dynamo driven by the engine, a motor coupled to the load shaft and connected to the dynamo for driving the shaft, a series wound regulator generator, means responsive to movement of the accelerator from idling position to connect said regulator in shunt with the series field coil of said dynamo, and means responsive to movement of said accelerator beyond substantially full throttle position for shunting the series field coil of said regulator generator.

18. In combination, an engine having a throttle control device, a load shaft, transmission means for driving said load shaft from said engine, means controlled by said throttle control device in idling position for rendering said transmission means inoperative and to render said transmission means operative when moved in a direction to open said engine throttle, and a separate throttle control device for said engine operable independently of said first throttle control device.

19. In combination, an engine having a throttle and a control device therefor, a load shaft, an electric transmission circuit for driving said load shaft from said engine, a switch operated by said throttle control device in idling position to de-energize said circuit and to energize the circuit when in accelerating position, and separate means for accelerating said engine without operating said switch.

20. In combination, a vehicle having an engine and a propeller shaft, an electric transmission system for driving said propeller shaft from said engine, an accelerator pedal for said engine, means controlled by said pedal in idling position for rendering said system inoperative and to render the system operative when moved from idling position, and a separate manual control for accelerating said engine independently of said pedal.

21. In combination, an engine having a throttle, a load shaft, transmission means for driving said load shaft from said engine, a throttle control device having a lost motion connection to said throttle, means for biasing said throttle to idling position, separate means for biasing said control device to a released position, means operated by said control device for rendering said transmission means inoperative when in released position and for rendering it operative when moved from released position, and a second throttle control device connected to said throttle for operating said throttle independently of said first throttle control device within the range of movement of said lost motion connection.

22. In combination, an engine having a throttle, a load shaft, transmission means for driving said load shaft from said engine, a throttle control device having a lost motion connection to said throttle, means for biasing said throttle to idling position, separate means for biasing said control device to a released position, means operated by said control device for rendering said transmission means inoperative when in released position, said last named means being operated by the initial movement of said throttle control device in taking up a part of the lost motion of said connection to render said transmission means operative, and a second throttle control device connected to said throttle for operating said throttle independently of said first throttle control device within the range of movement of said lost motion connection.

23. A system for transmitting power from a load member to an engine for braking said load member by engine friction, said system including a power dynamo having a field winding, a series wound regulating dynamo, and an electric power transmission load circuit including said field winding and said regulating dynamo connected in parallel circuit relation with each other.

24. A system for transmitting power from a load member to an engine for braking said load member by engine friction, said system including a power dynamo having a field winding, a series wound regulating dynamo connected in fixed speed relation with said load member, an electric power transmission load circuit including said field winding and said regulating dynamo connected in parallel circuit relation with each other, said regulating dynamo having predetermined resistance and voltage characteristics with respect to the resistance of and voltage drop across said field winding for limiting the magnitude of engine friction braking at relatively high speeds of said load member and for varying said engine friction braking at other speeds of said load member.

25. In combination, an engine, a dynamo driven by the engine, a load shaft, a dynamo coupled to the load shaft, a load circuit connecting said dynamos including a field coil on the second dynamo, and a series wound regulator generator connected in parallel circuit relation with said field coil for operating the second dynamo as a generator to brake said load shaft.

26. In combination, an engine, a series wound dynamo driven by the engine, a load shaft, a series wound dynamo coupled to said load shaft, a load circuit connecting said dynamos, the first dynamo being connected as a series motor for rotation in the direction of engine rotation, and a series wound regulator generator connected in parallel circuit relation with the series field coil of the second dynamo for operating said dynamo as a generator to brake said load shaft by engine friction.

27. In combination, a vehicle having an engine and a load shaft, a dynamo driven by said engine, a second dynamo cooperating with said first dynamo to drive said load shaft from said engine, means for operating the second dynamo as a generator and the first dynamo as a motor to retard the operation of said vehicle by engine braking, mechanical brakes for said vehicle and a control element therefor, and means responsive to the operation of said control element for increasing the braking effect of said engine.

28. Means for braking a load and reversing the power flow between an engine and a load which includes a vehicle having an engine and an engine shaft, a load shaft, a dynamo rotatively associated with one of the shafts, a second dynamo rotatively associated with both shafts having an armature and a field coil, a load circuit including the dynamos and the field coil, a switch, means controlled by said switch operative when in one position to effect power flow from engine shaft to load shaft for accelerating the vehicle and when in another position to effect power flow from load shaft to engine shaft for decelerating the vehicle with the aid of engine friction, and separate means for variably controlling the degree of engine braking established by said first means.

29. Means for braking a load and reversing the power flow between an engine and a load which includes a vehicle having an engine and an engine shaft, a load shaft, a dynamo rotatively associated with one of the shafts, a second dynamo rotatively associated with bolt shafts having an armature and a field coil, a load circuit including the dynamos and the field coil, a switch, means controlled by said switch operative when in one position to effect power flow from engine shaft to load shaft for accelerating the vehicle and when in another position to effect power flow from load shaft to engine shaft for decelerating the vehicle with the aid of engine friction, mechanical brakes for said vehicle, and means responsive to the operation of said mechanical brakes for increasing the degree of engine friction braking.

30. Apparatus for transmitting power including an engine member, a load member, a dynamo connected in fixed speed relation with the engine member having a field element an armature and a field coil, a second dynamo having a field element an armature and a field coil, a differential gearing connecting the second dynamo in variable speed relation with the engine and load members, an electric load circuit including both armatures and both field coils, all connected in series circuit relation, a separate source of current, and means including the separate source of current for normally maintaining a slight and substantially constant magnetization force in one field element opposing the magnetizing force of the current in the load circuit.

31. Apparatus for transmitting power including an engine member, a load member, a dynamo connected in fixed speed relation with the engine member having a field element an armature and a field coil, a second dynamo having a field element an armature and a field coil, a differential gearing connecting the second dynamo in variable speed relation with the engine and load members, an electric load circuit including both armatures and both field coils, all connected in series circuit relation, the first dynamo being connected as a series motor and the second as a series generator, a series wound regulator generator, an accelerator for said engine, and a switch controlled by said accelerator to connect said regulator generator in shunt with the series field coil of the second dynamo in idling position and in shunt with the field coil of the first dynamo upon movement away from idling position.

32. Apparatus for transmitting power including an engine member, a load member, a dynamo connected in fixed speed relation with the engine member having a field element an armature and a field coil, a second dynamo having a field element an armature and a field coil, a differential gearing connecting the second dynamo in variable speed relation with the engine and load members, an electric load circuit including both armatures and both field coils, all connected in series circuit relation, an auxiliary field coil for one dynamo, and means including a separate source of current connected to said auxiliary coil for normally maintaining a slight and substantially constant magnetization force in one field element opposing the magnetizing force of the current in the load circuit.

33. Apparatus for transmitting power including an engine member, a load member, a dynamo connected in fixed speed relation with the engine member having a field element an armature and a field coil, a second dynamo having a field element an armature and a field coil, a differential gearing connecting the second dynamo in variable speed relation with the engine and load members, an electric load circuit including both armatures and both field coils, all connected in series circuit relation, the first dynamo being connected as a series motor and the second as a series generator, an auxiliary field coil for the first dynamo, means including a separate source of current connected to said auxiliary coil for normally maintaining a slight and substantially constant magnetization force in the field element of the first dynamo for generating a voltage in the same direction as the second dynamo.

34. Apparatus for transmitting power including an engine member, a load member, a dynamo connected in fixed speed relation with the engine member having a field element an armature and a field coil, a second dynamo having a field element an armature and a field coil, a differential gearing connecting the second dynamo in variable speed relation with the engine and load members, an electric load circuit including both armatures and both field coils, all connected in series circuit relation, the first dynamo being connected as a series motor and the second as a series generator, means including a separate source of current for normally maintaining a slight and substantially constant magnetization force in the field element of the first dynamo for generating a voltage in the same direction as the second dynamo, and means for normally shunting the field coil of the second dynamo.

35. Apparatus for transmitting power including an engine member, a load member, a dynamo connected in fixed speed relation with the engine member having a field element an armature and a field coil, a second dynamo having a field element an armature and a field coil, a differential gearing connecting the second dynamo in variable speed relation with the engine and load members an electric load circuit including both armatures and both field coils, all connected in series circuit relation, the first dynamo being connected as a series motor and the second as a series generator, means including a separate source of current for normally maintaining a slight and substantially constant magnetization force in the field element of the first dynamo for generating a voltage in the same direction as the second dynamo, means for normally shunting the field coil of the second dynamo, an accelerator for the engine, and means controlled by movement of said accelerator from idling position to open the shunt around the coil of the second dynamo and to shunt the field coil of the first dynamo.

36. A power transmission system including an engine having a shaft, a load shaft, a pair of power transmitting dynamos each having an armature and a series field coil, a reversing switch when in position for forward operation to connect both field coils with respect to their armatures in motoring direction for rotation in direction of engine rotation and when in position for reverse operation to reverse both field coils with respect to the armatures, a regulating dynamo, a regulator switch for connecting the regulating dynamo in shunt circuit with the field coil of one of the dynamos when the reversing switch is moved into forward position and to open the regulator switch when the reversing switch is moved into reverse position.

37. A power transmission system including an engine having a shaft, a load shaft, a dynamo connected in fixed speed relation with the engine shaft having an armature and a series field coil, a second dynamo connected with the load shaft and electrically connected with the first dynamo, a regulating dynamo connected with the dynamos, a storage battery connected with the dynamos, controlling means when in position for forward operation to connect the regulator in shunt with the series field coil of the first dynamo and when in engine starting position to connect the first dynamo in circuit with said battery and out of circuit with the second dynamo and the regulating dynamo.

38. A power transmission system including an engine having a shaft, a load shaft, a pair of power transmitting dynamos each having an armature and a series field coil all connected in series circuit relation, a regulating dynamo having one of its terminals connected with one end of each field coil, a switch having a contactor each connected to the other end of the field coils and a finger connected to the free end of the regulator terminal, a spring for establishing contact between said finger and one of said contactors, and means for rocking said switch finger to make contact with one or the other contactor.

39. A vehicle having a body, apparatus for driving said vehicle including an engine member, a load member, electric transmission apparatus for transmitting power between the members mounted for relative movement with respect to the vehicle body, a control switch secured to the transmission apparatus for controlling the power transfer and having a plurality of control positions, locking means arranged in fixed relation to the switch for holding the control switch in a plurality of operating positions, an operating member for said switch mounted upon the body of the vehicle including an operating connection to the switch for moving the switch from one position to another while permitting relative movement between the switch structure and the body.

40. In combination, an engine, a dynamo driven by the engine, a load shaft, a dynamo coupled to the load shaft, a load circuit connecting said dynamos including a field coil on the second dynamo, and a series wound regulator generator driven by the load shaft and connected in parallel circuit relation with said field coil for operating the second dynamo as a generator to brake said load shaft.

41. In combination, an engine, a series wound dynamo driven by the engine, a load shaft, a series wound dynamo coupled to said load shaft, a load circuit connecting said dynamos, the first dynamo being connected as a series motor for rotation in the direction of engine rotation, a regulator generator connected in parallel circuit relation with the series field coil of the second dynamo for operating said dynamo as a generator to brake said load shaft by engine friction, and means for variably shunting the series field coil of the first dynamo to control the degree of braking.

42. In combination, a vehicle having an engine and a load shaft, a dynamo driven by said engine, a second dynamo cooperating with said first dynamo to drive said load shaft from said engine, means for operating the second dynamo as a generator and the first dynamo as a motor to retard the operation of said vehicle by engine braking, mechanical brakes for said vehicle and a control element therefor, and means responsive to the operation of said control element for decreasing the field strength of said first dynamo.

43. In combination, a vehicle having an engine and a load shaft, a series wound dynamo driven by the engine, a series wound dynamo coupled to said load shaft, a load circuit connecting said dynamos, the first dynamo being connected as a series motor for rotation in the direction of engine rotation, a regulator generator connected in parallel circuit relation with the series field coil in the second dynamo for operating said dynamo as a generator to brake said load shaft by engine friction, mechanical brakes for said vehicle and a control element therefor, and means responsive to the operation of said control element for variably shunting the series field coil of said first dynamo to increase the engine braking.

ALFONS H. NEULAND.